US008277586B2

(12) United States Patent
Laurent et al.

(10) Patent No.: US 8,277,586 B2
(45) Date of Patent: Oct. 2, 2012

(54) PRODUCTION PROCESS FOR HYDRAULIC BINDER-BASED BOARDS WITH FOUR TAPERED EDGES, PRODUCTION LINE OF SUCH BOARDS

(75) Inventors: Jean-Louis Laurent, Bayas (FR); José Madeira, Rieux (FR); Stéphane Mettavant, Avignon (FR); Dominique Ribas, Monteux (FR)

(73) Assignee: Lafarge Platres, Avignon (FR)

( * ) Notice: Subject to any disclaimer, the term of this patent is extended or adjusted under 35 U.S.C. 154(b) by 762 days.

(21) Appl. No.: 12/300,259

(22) PCT Filed: May 4, 2007

(86) PCT No.: PCT/IB2007/002568
§ 371 (c)(1), (2), (4) Date: Jun. 5, 2009

(87) PCT Pub. No.: WO2007/129228
PCT Pub. Date: Nov. 15, 2007

(65) Prior Publication Data
US 2009/0301647 A1 Dec. 10, 2009

(30) Foreign Application Priority Data
May 10, 2006 (FR) ..................................... 06 04129

(51) Int. Cl.

| | |
|---|---|
| ***B29C 65/00*** | (2006.01) |
| ***B32B 29/00*** | (2006.01) |
| ***B32B 37/00*** | (2006.01) |
| ***B32B 38/10*** | (2006.01) |
| ***B32B 38/04*** | (2006.01) |
| ***B44C 3/08*** | (2006.01) |
| ***B44C 5/04*** | (2006.01) |

(52) U.S. Cl. ............ 156/45; 156/220; 156/510; 52/342

(58) Field of Classification Search .................... 156/45, 156/220, 510; 52/342
See application file for complete search history.

(56) References Cited

U.S. PATENT DOCUMENTS 2,168,803 A 8/1939 Page
(Continued)

FOREIGN PATENT DOCUMENTS

CA 2536971 * 3/2005
(Continued)

OTHER PUBLICATIONS

International Preliminary Report on Patentability and Attached Written Opinion (Forms PCT/IB/326, PCT/IB/373 and PCT/ISA/237) mailed by the International Bureau on Nov. 20, 2008 in corresponding PCT/IB2007/002568, The International Bureau of WIPO, Geneva, Switzerland.
PCT/ISA/210.

*Primary Examiner* — Michael Orlando
(74) *Attorney, Agent, or Firm* — Buchanan Ingersoll & Rooney PC

(57) ABSTRACT

A production process is provided for a board of hydraulic binder with a facing on each of its sides. The process includes on one side first tapered parallel edges and on the same side or the other side, two second tapered parallel edges perpendicular to the first. The process also includes the use of a forming lath having at least two distal parts. The process can be used in a production line that includes a specific lath.

25 Claims, 7 Drawing Sheets

U.S. PATENT DOCUMENTS

| | | | |
|---|---|---|---|
| 2,246,987 | A | 6/1941 | Roos |
| 2,991,824 | A | 7/1961 | Loechl |
| 3,912,435 | A | 10/1975 | Waring |
| 4,397,123 | A | 8/1983 | Parker |
| 5,198,052 | A | 3/1993 | Ali |
| 2001/0044016 | A1 | 11/2001 | Watras |
| 2005/0224154 | A1 | 10/2005 | Capron |
| 2006/0198989 | A1 | 9/2006 | Jallon et al. |

FOREIGN PATENT DOCUMENTS

| | | |
|---|---|---|
| EP | 0482810 | 4/1992 |
| WO | WO 03/041930 | 5/2003 |
| WO | WO 03/072326 | 9/2003 |
| WO | WO 03/084724 | 10/2003 |
| WO | WO 2004/009309 | 1/2004 |
| WO | WO 2005/028171 | 3/2005 |

* cited by examiner

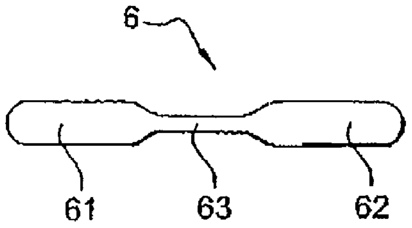
Fig. 2
Fig. 3
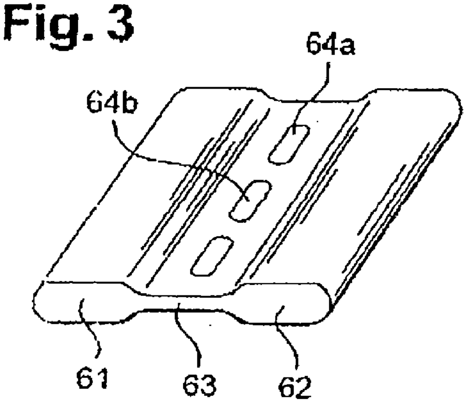
Fig. 5
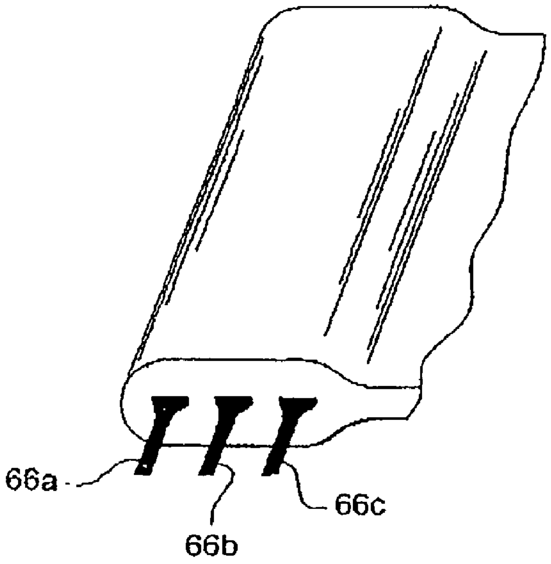
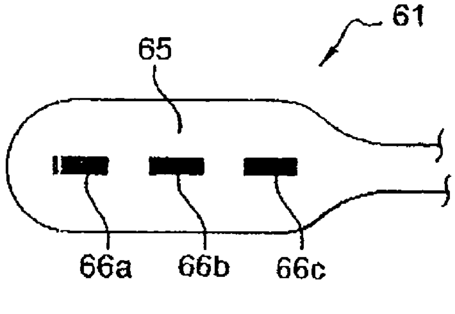
Fig. 4

PRODUCTION PROCESS FOR HYDRAULIC BINDER-BASED BOARDS WITH FOUR TAPERED EDGES, PRODUCTION LINE OF SUCH BOARDS

FIELD OF THE INVENTION

The invention relates to a production process for boards with four feathered edges based on hydraulic binders, and for this purpose a production line for boards based on hydraulic binders, as well as a specific dedicated element.

TECHNOLOGICAL BACKGROUND

In U.S. Pat. No. 2,991,824, recesses 51A, 51B are produced in a preform intended to be cut in order to produce plaster boards, by means of (see in particular FIG. 1 and column 3, lines 29 to 43 of this patent) a conveyor 20 turning around two rolls 21 and comprising a mould strip 25. The preform is then cut at the middle of the recesses so as to produce boards with feathered ends or feathered transverse edges.

In U.S. Pat. No. 2,246,987, recesses are produced in a preform intended to be cut in order to produce plaster boards, by means (see in particular FIGS. 1 and 7) of a conveyor 0 comprising a plurality of bars 23, 38. In one embodiment, recesses are produced on both sides of the board at the same time.

In U.S. Pat. No. 2,168,803, recesses are produced in a preform intended to be cut in order to produce plaster boards, by means of supporting members 21 (see in particular FIG. 1). These supporting members can be temporarily fixed to the lower facing, for example by stapling. These supporting members are applied in particular before the facing receives the gypsum paste, but it is also possible to envisage applying them after pouring the paste.

Patent Application WO-A-2005/028171 describes a new board with four feathered edges, as well as production processes, and devices for the production of these boards. The Applicant is also the proprietor of the patent applications WO-A-03/041930, WO-A-03/072326 and WO-A-2004/009309, as well as WO-A-03/084724. These patent applications use laths in order to form transverse featherings during the production of the boards.

The processes described are satisfactory from a production point of view, but at the level of the product, it is also sought to improve the rendering of the feathering formed transversely. In particular, a solution is sought which makes it possible to obtain a feathering, which is perfectly symmetrical and perfectly rectilinear.

OBJECTS AND SUMMARY

The disclosure aims to solve the problem of the production of recesses in a preform which lead to a final symmetrical and rectilinear transverse feathered section.

The disclosure relates to a production process for a board made of hydraulic binder having a facing on each of its sides, comprising on one side two first feathered parallel edges (10) and on the same side or the other side two second other feathered parallel edges (25*bis*) perpendicular to the first ones, said process comprising the following stages:

1) pouring a hydraulic binder composition (2) onto a facing material (1) supported by a conveyor belt (7) comprising at least two forming strips equipped with longitudinal tapes, and covering with a second facing material so as to obtain a preform (5), then producing an impression (12) in the upper part and/or an impression (12*bis*) in the lower part of the preform, using at least one lath (6) having at least two distal parts (61, 62);

2) allowing the hydraulic setting of the hydraulic binder composition (2) to take place; and 3) cutting the preform (5) at the level of the feathering (8) created by the impression (12) in a board made of hydraulic binder having a facing on each of its sides, comprising on one side two first feathered parallel edges and on the same side or the other side two other feathered parallel edges perpendicular to the first ones.

According to one embodiment, the impression is produced by introducing a lath before the forming plate device (4). The impression may be produced before the first forming strip.

According to one embodiment, the impression (12*bis*) is produced on the lower part of the preform (5). Alternatively, and in a preferred manner, the impression (12) is produced on the upper part of the preform (5).

According to one embodiment, the disclosure provides a production process for a board made of hydraulic binder having a facing on each of its sides, comprising on one side two first feathered parallel edges (10) and on the other side two second other feathered parallel edges (25*bis*) perpendicular to the first ones, said process comprising the following stages:

1) pouring a hydraulic binder composition (2) onto a facing material (1) supported by a conveyor belt (7) comprising at least two forming strips equipped with longitudinal tapes, and covering with a second facing material so as to obtain a preform (5), then producing an impression (12) in the upper part of the preform, using at least one lath (6) having at least two distal parts (61, 62);

2) allowing the hydraulic setting of the hydraulic binder composition (2) to take place; and 3) cutting the preform (5) at the level of the thinned section (8) created by the impression (12) in a board made of hydraulic binder having a facing on each of its sides, comprising on one side two first feathered parallel edges and on the same side or the other side two other feathered parallel edges perpendicular to the first ones.

According to one embodiment, the lath is withdrawn before the start of hydraulic setting. The impression may be produced before the first forming strip.

The impression may be produced before the first forming strip.

According to one embodiment, the lath comprises a plurality of bars (66*a*, 66*b*, 66*c*) embedded in a polymer matrix (65) at the level of the distal parts.

According to one embodiment, the bar is flat with an aspect ratio comprised between 10:1 and 3:1.

According to one embodiment, the lath comprises two distal parts (61, 62) separated by a central part (63), this central part representing between 20 and 90%, preferably between 25 and 60%, of the total width of the lath.

According to one embodiment, the lath comprises two distal parts (61, 62) separated by a central part (63) comprising a plurality of recesses (64*a*, 64*b*).

According to one embodiment, the recesses (64*a*, 64*b*) have a width comprised between 4 and 12 mm, a length comprised between 8 and 20 mm and a space between the recesses of between 15 and 30 mm.

According to one embodiment, the impression is produced on the upper part of the preform, in order to produce a board with a facing on each of its sides, comprising on one side two first feathered parallel edges (10) and on the other side two second other feathered parallel edges (25*bis*) perpendicular to the first ones.

According to one embodiment, in the board, said second feathered parallel edges (25*bis*) are transverse.

According to one embodiment, the board also comprises two third feathered edges (25*ter*) parallel to the second feathered edges (25*bis*), on the other side of the board than the face comprising said second feathered edges (25*bis*).

According to one embodiment, in the board the ratio of the depth of said second feathered edges (25*bis*) to the depth of said third feathered edges is comprised between 1 and 10, preferably between 2 and 5.

According to one embodiment, in the board said second other feathered parallel edges (25*bis*) have a width comprised between 100 and 200 mm.

According to one embodiment, in the board the width of said second feathered parallel edges (25*bis*) is comprised between 120 and 180 mm or between 150 and 200 mm or between 100 and 150 mm.

According to one embodiment, in the board said first (10) and second feathered parallel edges (25*bis*) have an approximately equal length.

According to one embodiment, in the board said other feathered parallel edges (25*bis*) have a width such that the ratio of the width of said second feathered parallel edges (25*bis*) to the width of said first feathered parallel edges (10) is comprised between 1.5 and 5, preferably between 2 and 4.

A subject of the disclosure is also a production line for boards based on hydraulic binder from a preform (5) comprising a facing material (1) covered with a hydraulic binder composition (2) and supported by a conveyor belt (7), comprising a forming strip equipped with longitudinal tapes; this line also comprising a device producing an impression (12) of the preform, this impression being produced on the upper part of the preform, and in which the device for formation of the impression comprises at least:

a frame (101), two first pulleys (102, 103) supported at a first end (104) of the frame (101) and two second pulleys (105, 106) at a second end (107) of the frame (101); the first pulleys (102, 103) and second pulleys (105, 106) being in parallel planes; the pulleys opposite the one (102, 103) and the other (105, 106) being identical;

two drive belts (108, 109) surrounding respectively the first pulleys (102, 103) and the second pulleys (105, 106);

at least one lath (6) fixed in a removable manner to the belts (108, 109) and extending between these belts (108, 109), in such a way that its longitudinal axis is parallel to the axis of rotation of the pulleys (102, 103, 105, 106);

said lath (6) having at least two distal parts (61, 62);

the distance between the drive belts (108, 109, 206) of this device being at least equal to the width of the preform (5) and this device being arranged in an appropriate manner so that when its drive belts (108, 109, 206) turn, said at least one lath (6) creates an impression (12 or 12*a*) in the preform (5).

According to one embodiment, the line also comprises upper (214) and lower forming plates (215), between which the lath (6) can pass. The impression may be produced before the first forming strip.

According to one embodiment, the lath used in the line is that described with reference to the embodiments of the process given above.

According to one embodiment of the process or the line, the hydraulic binder comprises plaster.

A subject of the disclosure is also a production process for a board made of hydraulic binder having a facing on each of its sides, comprising on one side two first feathered parallel edges (10) and on the other side two second other feathered parallel edges (25*a*) perpendicular to the first ones, said process using a production line according to the invention.

A subject of the disclosure is also a lath (6) having two distal parts (61, 62), separated by a central part, characterized in that the lath comprises a plurality of bars (66*a*, 66*b*, 66*c*) embedded in a polymer matrix (65) at the level of the distal parts and in that the central part represents between 20 and 90%, preferably between 25 and 60%, of the total width of the lath and in that the central part (63) comprises a plurality of recesses (64*a*, 64*b*).

According to one embodiment, the bar is flat with an aspect ratio comprised between 10:1 and 3:1.

According to one embodiment, the recesses (64*a*, 64*b*) have a width comprised between 4 and 12 mm, a length comprised between 8 and 20 mm and a space between the recesses of between 15 and 30 mm.

The use of such a device makes it possible to easily vary the space between two impressions and therefore the length of the boards.

A subject of the disclosure is also a production process for a board based on hydraulic binder from a preform intended to be cut, this process comprising a stage during which an impression is produced in the preform using a device.

This process in particular has the advantage of allowing boards to be obtained with feathered edges, in which board the transverse feathered edges can be on the same side as the standard feathered edges or on the opposite side, the transverse edges having great symmetry and rectilinear character.

Finally, the subject of the disclosure is also a production line for boards based on hydraulic binder from a preform comprising a facing material covered with a hydraulic binder composition and supported by a conveyor belt (or forming strip). This production line also has the advantage of allowing the production of boards with feathered edges, with specific transverse edges described below.

BRIEF DESCRIPTION OF THE FIGURES

Other characteristics and advantages of the invention will now be described in detail in the following description of preferred embodiments, which is given with reference to the figures, in which:

FIG. 2 represents a section of the lath used in an embodiment of the invention;

FIG. 3 represents a top and in perspective view of a lath used in an embodiment of the invention;

FIG. 4 represents an enlarged section of the lath used in an embodiment of the invention;

FIG. 5 represents an enlarged top and in perspective view of a lath used in an embodiment of the invention;

DETAILED DESCRIPTION OF PREFERRED EMBODIMENTS

Figure 1:
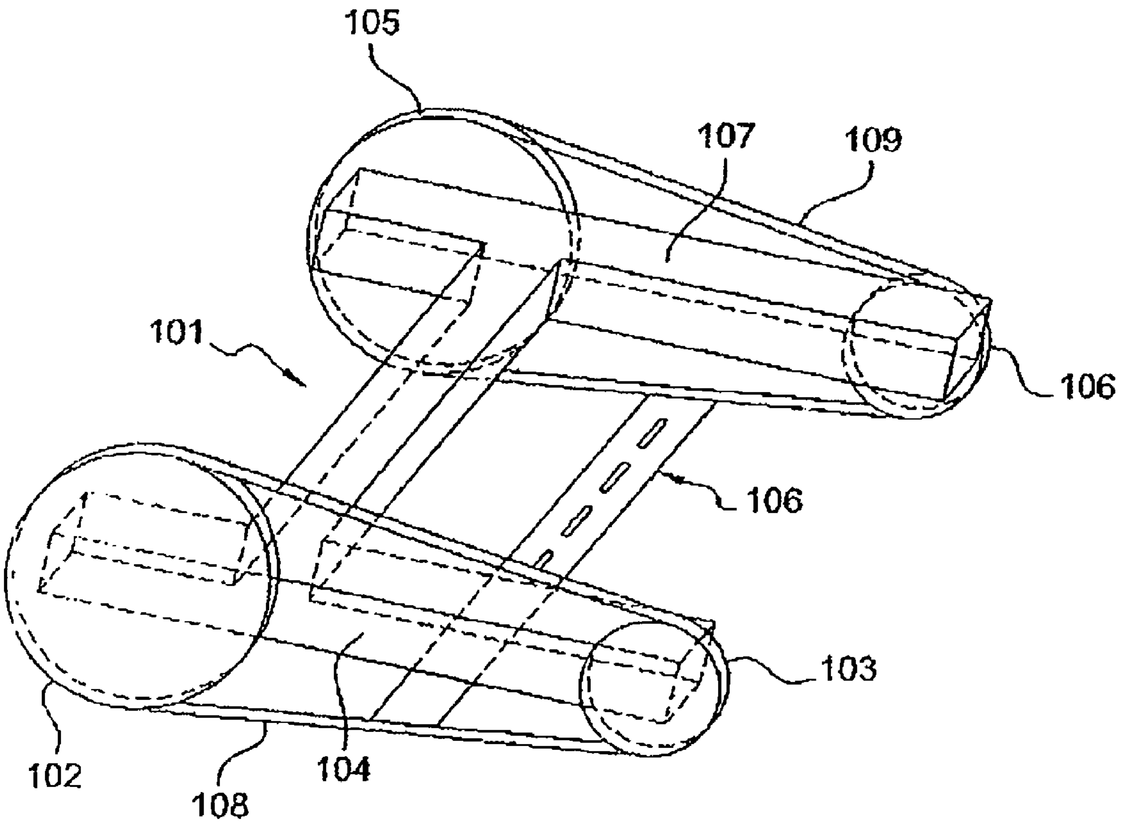
FIG. 1 represents diagrammatically and in perspective, a device according to an embodiment of the invention.

The device is represented diagrammatically in FIG. 1. It is described in a general manner in the patent applications WO-A-03/072326 and WO-A-2005/028171, which are incorporated herein by reference.

It comprises a frame 101 which is in the shape of an H, but to which a person skilled in the art could easily give numerous other forms.

On this frame 101, at a first end 104, two first pulleys 102 and 103 are supported and, at a second end 107, two second pulleys 105 and 106.

The first pulleys 102, 103 are situated in a first plane, the second pulleys 105, 106 in a second plane and the first plane is parallel with the second plane.

The pulley 102 and the pulley 105 are the same size and situated one facing the other. The pulley 103 and the pulley 106 are also the same size and situated one facing the other.

The pulleys 102, 103, 105 and 106 can turn about themselves.

A first drive belt 108 surrounds the first pulleys 102, 103 and a second drive belt 109 surrounds the second pulleys 105, 106.

The drive belts 108 and 109 are identical. They are connected to one another by at least one lath 6. This lath confers useful properties on the boards produced.

This lath 6 is fixed in a removable manner to the first and second belts 108, 109 and in such a way that its longitudinal axis is parallel to the axis of rotation of the pulleys.

Thus, when one of the pulleys, for example the pulley 102, turns, it drives the drive belt 108 which itself drives the other pulley situated in the same plane as it (the pulley 103) as well as the elongated lath 6. The latter then moves according to the defined trajectory, on the one hand, via the loop constituted by the belt 108 and, on the other hand, as it is connected to the second belt 109, also via the loop constituted by the latter.

The symmetry of the device therefore allows the axis of the lath 6 to move according to an ellipse, its axis remaining constantly parallel to that of the pulleys.

It is possible to envisage that two pulleys situated one facing the other are fixed on the same shaft.

The device can also comprise means for driving in rotation at least one of the pulleys. These means can optionally drive two pulleys by means of the shaft on which they are mounted.

The lath 6 generally has an approximately flat shape.

The lath 6 can be fixed for example by screwing on the drive belts so as to be able to be easily unscrewed and replaced by another lath.

The pulleys are preferably toothed wheels and the drive belts are chains, which can cooperate with these toothed wheels.

The lath is described in more detail with reference to FIGS. 2-5.

With reference to FIG. 2, the lath 6 can be seen in section. This lath has two distal parts 61 and 62, with an intermediate part 63. This intermediate part can have a thickness identical to the distal parts, a lesser thickness as represented, or also a greater thickness. A lesser thickness will be preferred (for example between 30 and 80% of the thickness of the distal parts). The intermediate or central part can represent between 20 and 90%, for example between 25 and 60%, of the total width of the lath. The central part acts as a central hinge.

With reference to FIG. 3, the distal parts 61 and 62, as well as the central part 63 can be seen. This central part advantageously comprises a series of recesses 64*a*, 64*b*. These recesses allow better flexibility of this central part without compromising its strength. The recesses can be circular or oblong, preferably oblong. The number of the recesses is variable depending on the size of the lath and the dimensions of the recesses. Preferably, the recesses have a width comprised between 4 and 12 mm, a length comprised between 8 and 20 mm and a space between the recesses of between 15 and 30 mm.

With reference to FIG. 4, an enlargement of a distal part 61 can be seen. This distal part comprises a polymer matrix 65. This polymer is relatively rigid, and the flexibility is advantageously provided by the recesses 64*a*, 64*b*. This polymer is for example PEHD. The nature of the material is in particular determined by the speed of the line and the accelerations experienced and the dimensions of the lath. In this polymer, bars 66*a*, 66*b* and 66*c* are embedded. These bars have a circular shape (wires) or preferably a flat shape. The ratio in the case of the flat shape is in particular comprised between 10:1 and 3:1, for example approximately 6:1. These bars are generally metallic, but another rigid material is possible.

With reference to FIG. 5, a top and in perspective view of an enlargement of a distal part can be seen. This distal part shows the bars which extend beyond the polymer part, these bars can be reworked in a circular version (these extended circular elements then being on this part in the form of wires) or remain flat, which is the preferred embodiment.

These wires can then be fixed and connected to the device, as is indicated in the application WO-A-2005/028171, with reference to FIGS. 2 to 5 and corresponding description, or in application WO-A-03/072326, with reference to FIGS. 4 to 7 and corresponding description.

In particular, the belt is a chain having links some of which receive the ends of the bars of the lath.

The length of the lath 6 is generally approximately equal to the width of the preform. Moreover, the lath can have a profile generally in the form of a parallelepiped, but also in the form of a triangle, etc. The parallelepiped with a central part of lesser thickness will be preferred.

The material constituting the laths 6 is not very important as long as it allows these laths to resist the weight of the thickness of preform 5 which is situated above each lath 6. This can therefore be a plastic material, wood, metal, etc. having a good resistance to wear and stability over time.

The thickness of the lath is connected to the dimensions of the featherings. In general, the thickness of the lath 6 is generally comprised between 0.5 and 4 mm, preferably between 1.5 and 3 mm. Its width is generally comprised between 5 and 30 cm, preferably between 10 and 25 mm.

The production of the lath can comprise a stage during which the bars are placed in a mould and the polymer is injected in the molten state. It is also possible to use a thermosetting (thermohardening) polymer rather than thermoplastic.

Moreover, it is also possible to not have a central part; the lath in this case advantageously comprises the elements in the form of bars, as described below.

It would also be possible to have three parts of the distal part type, separated two-by-two by intermediate parts of the central part type described above.

Its dual nature makes it possible to obtain depths of transverse featherings which are greater compared to a single lath. The use of flat bars in the lath provides better strength, improves the mechanical resistance and limits the wear of the system. The lath also allows increased rigidity and provides more rectilinear featherings.

The device can serve, in a production process for boards based on hydraulic binder, to produce an impression in the preform intended to be cut in order to produce the boards based on hydraulic binder.

In order to produce the impressions, another known device could be used, for example that which is the subject of U.S. Pat. No. 2,168,803. The lath can be used in order to be pasted under the paper facing. Similarly, the lath can be used in the processes described in the patent applications in the name of the applicant, and in particular the patent applications WO-A-2005/028171, WO-A-03/041930, WO-A-03/072326 and WO-A-2004/009309.

When the lath 6 is used in order to produce featherings, the preform is then preferably cut at the level of the impression or opposite the place where this impression has been produced (i.e. on the other side of the preform).

The device can be used in a production process for plaster boards with feathered edges. Such a process is illustrated by FIGS. 6 to 10. It comprises the following stages:

1) pouring a hydraulic binder composition (2) onto a facing material (1) supported by a conveyer belt (7), so as to obtain a preform (5), then introducing a lath (6) under the preform (5), the length of which lath is advantageously at least approximately equal to the width of the preform (5);

2) allowing the hydraulic setting of the hydraulic binder composition (2) to take place and withdrawing said lath (6);

3) cutting the preform (5) at the level of the feathering (8) created by the lath (6).

Longitudinally extending forming strips extend on opposite sides of the conveyor belt to form the longitudinal edges of the preform (5).

This production process for boards based on hydraulic binder and with feathered edges will now be described in detail with reference to FIGS. 6 to 10. Then, the use of the device in this process will be described.

Firstly, it is specified that by "transverse edges", is meant in the present description the edges perpendicular to the direction of movement of the conveyor belt in a production line for boards based on hydraulic binder. Such transverse edges are also called <<board ends>>.

Figure 6:
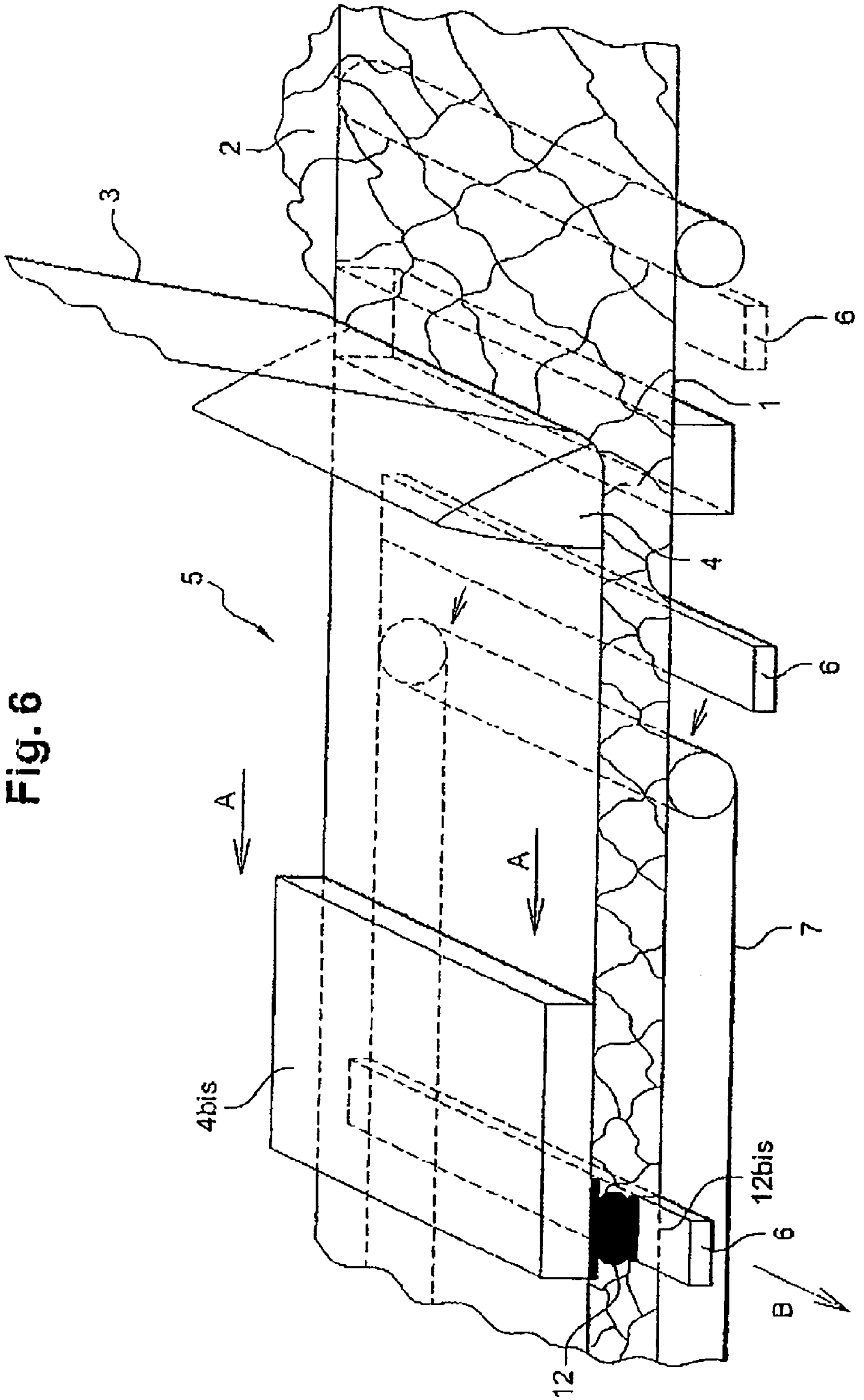
FIG. 6 diagrammatically represents a stage of a production process for boards based on hydraulic binder.

With reference to FIG. 6, a production line for boards produced by pouring a hydraulic binder composition 2 onto a facing material 1 is shown and, generally, covering with a second facing material 3. The passage of the whole under the forming plate 4 produces a preform 5.

The hydraulic binder composition preferably comprises plaster.

The facing materials 1 and 3 can be constituted by sheets of paper or cardboard, glass mats or by any material known to a person skilled in the art as being able to be used as facing material.

After the preform 5 comes out from under the board or forming plate 4 or from under the equivalent device used in the production line (for example, a master roll), a lath 6 is introduced between the preform 5 and the start of the conveyor belt 7. The distance between the forming plate 4 and the start of the conveyor belt 7 is such that the preform 5 has not yet had the time to harden appreciably and still has a high plasticity. The introduction takes place in such a way that the longitudinal axis of the lath 6 is approximately perpendicular to the direction of movement of the conveyor belt 7. It would also be possible to carry out the introduction before the forming plate, as indicated in the figure with reference to the lath represented integrally in dotted lines.

The lath 6 is then driven by the conveyor belt 7, just like the preform 5. The hydraulic setting and the hardening of the plaster composition 2 then take place all along the movement of the preform 5, designated by the arrows A.

Preferably, the withdrawal of the lath 6 takes place before the cutting of the preform 5. Thus, after a certain time, which correspond to a distance traveled by the preform 5 on the conveyor belt 7 and which a person skilled in the art is able to determine as a function of the speed of movement of the conveyor belt 7 and of the setting time of the plaster composition 2, the hardness of the preform 5 is sufficient for the lath 6 to be able to be withdrawn without deforming the preform 5 and without the plaster composition 2 occupying the space or feathering 8 (FIG. 7) left by the withdrawal of the lath 6.

The withdrawal of the lath 6 can be carried out in any appropriate manner. For example, when the length of the lath 6 is greater than the width of the preform 5, the lath 6 projects relative to the preform 5, and it is then possible to rapidly withdraw it in a direction approximately perpendicular to the direction of movement of the conveyor belt 7 and moving away from the latter. This withdrawal action is illustrated by the arrow B in FIG. 6.

The withdrawal of the lath 6 can also take place by this lath 6 falling into the space situated between two rolls constituting the system of conveyor belts which, generally, is not continued all along the production line, but is formed by several belts driven by rolls between which there are free spaces After the withdrawal of the lath 6, the preform 5 continues to move, still driven by the conveyor belt 7 and the hardening of the plaster composition 2 continues.

Figure 7:
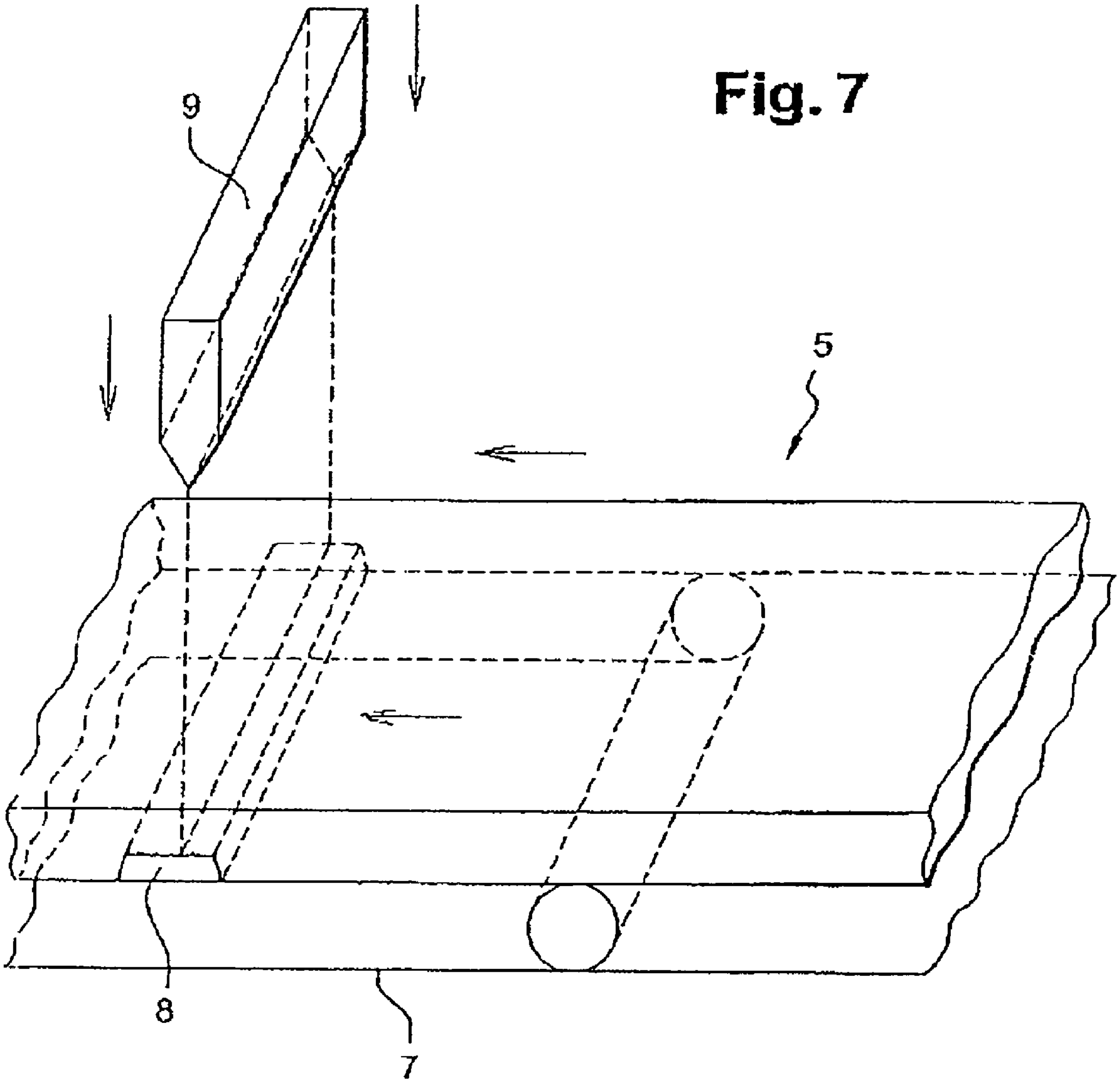
FIG. 7 diagrammatically represents another stage of a production process for boards based on hydraulic binder.
Figure 8:
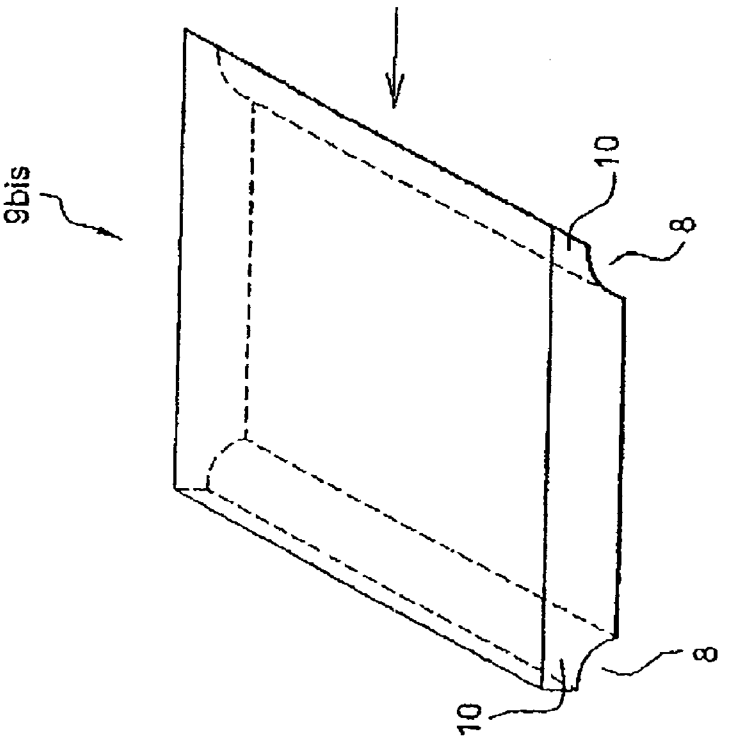
FIG. 8 represents a board that can be obtained with the process according to an embodiment of the invention.

As can be seen in FIG. 7, when the feathering 8 arrives at the level of the cutting device generally constituted by a roll provided with a knife 9, the latter starts up and cuts the preform 5. A board 9*bis*, shown in FIG. 8, is thus obtained the length of which is defined by the distance traveled by the conveyor belt between two cutting operations, i.e., by the distance traveled by the conveyor belt between two consecutive featherings 8. This board 9*bis* therefore has two transverse feathered edges 10. Preferably, the cutting device is adjusted so that the knife 9 cuts the preform 5 approximately in the middle of the feathering 8.

The size of each feathering 8 depends on the dimensions of the lath 6 and corresponds approximately to the dimensions of the lath indicated above. The length of the lath 6 is generally at least approximately equal to the width of the preform 5 (optionally reduced by the width of the longitudinal strips <<tapes>> optionally present), but is generally greater in order to be able to grasp it to withdraw it from below the preform 5. Moreover, it is desirable that the lath 6 has a length greater than the width of the preform 5, so as to protrude relative to the latter, which can facilitate its withdrawal. In the case where the lath is used with the device described with reference to the figures, this withdrawal problem no longer exists, the lath being accompanied by the pulleys.

Preferably, the process which has just been described complements a known production process for plaster boards having two feathered longitudinal edges. The latter generally envisages the placement of a strip, generally made of plastic, generally called a <<tape>>, on each longitudinal side of the conveyor belt 7. Such a process is described for example in European Patent Application No. 482 810.

Figure 9:
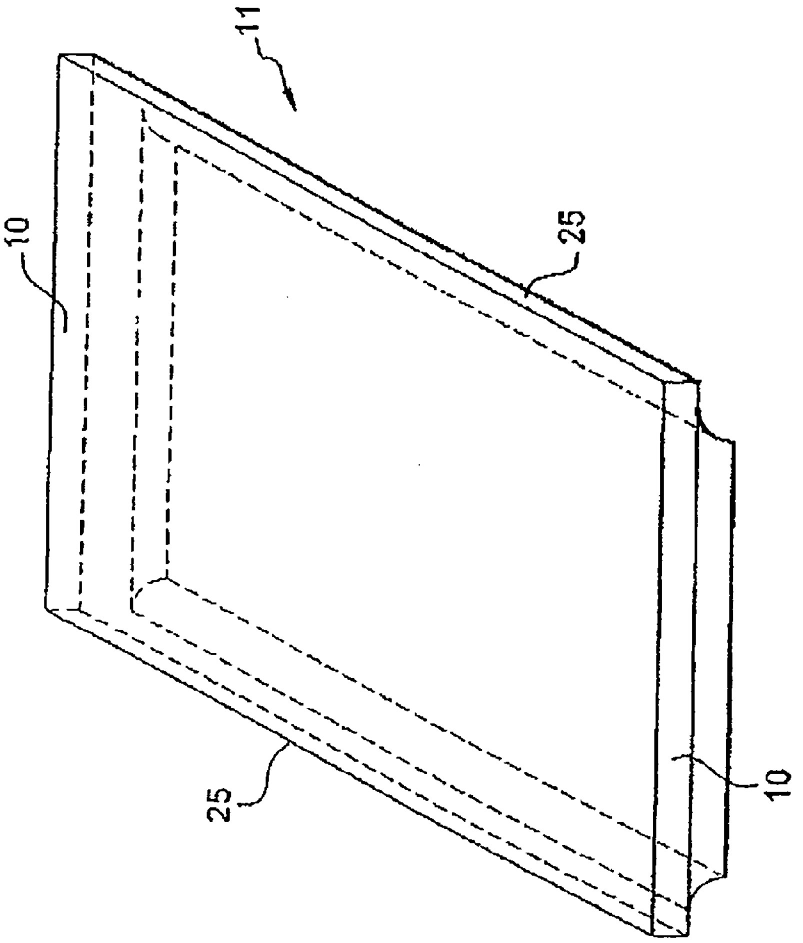
FIG. 9 represents another board that can be obtained with the process according to an embodiment of the invention.

This therefore makes it possible to obtain a board based on hydraulic binder 11 as illustrated in FIG. 9, having, besides its two transverse feathered edges 10, two feathered longitudinal edges 25, i.e. four feathered edges in total.

Of course if the frequency of the cutting operations is double that for the introduction of the laths 6, boards are obtained having 3 feathered edges (two longitudinal and one transverse).

The length of the plaster boards produced depends of course on the speed of movement of the conveyor belt and on the frequency of the cutting operations.

The frequency of the cutting operations is generally directly linked to the frequency of introduction of the laths, since it is generally sought to obtain boards having two transverse feathered edges.

This process is very flexible, since, in order to change the length of the boards produced, it is sufficient to simply modify the frequency of introduction of the laths.

According to another preferred variant, the lath is introduced at the level of the upper part of the preform. In this case, the impression (12) is produced in the upper part of the board and no longer in the lower part (12*bis*) as is the case with the embodiment of FIG. 6. The shaded part represents the impression (12) while the non-shaded part represents the impression (12*bis*). Reference can also be made to FIG. 5 of the Application WO-A-03/041930. The impressions lead to the transverse featherings which are described in more detail below. Advantageously, the laths are withdrawn before the start of the hydraulic setting, this setting in fact beginning only at the level of the (first) forming strip.

The lath can be used in the production processes for boards with four feathered edges, and in particular in the processes described and claimed in the following patent applications in the name of the applicant: WO-A-03/041930, WO-A-03/072326, WO-A-03/084724, WO-A-2004/009309 and WO-A-2005/028171. These patent applications use laths in order to form transverse featherings during the production of the boards. The invention therefore also relates to the use of the lath in the processes claimed in these patent applications.

The device can be used in a production line for boards based on hydraulic binder from a preform 5 comprising a facing material 1 covered with a composition of hydraulic binder 2 and supported by a conveyor belt 7.

In order for the device to be able to be used in an optimal manner on the production line for boards based on hydraulic binder, the distance between the drive belts of this device is at least equal to the width of the preform 5. Thus, these belts and the pulleys are situated on each longitudinal side of the preform.

Moreover, the device is arranged in an appropriate manner so that, when its drive belts turn, its elongated means creates a recess in the preform 5.

The device according to the invention can be above the preform 5, in this case, it creates the impression 12, or under the preform 5, in which case it creates the impression 12*bis*.

For practical reasons, it is preferred that the device is situated above the preform 5.

Of course, two (or more) devices could be envisaged, one being situated above and the other below the preform, so as to create respectively, one impression 12 on the top of the preform 5 and an impression 12*bis* on the bottom of the preform 5, the bottom of the preform 5 being the side of this preform 5 which rests on the conveyor belt 7.

The cutting device can be adjusted in order to cut the preform at the level of an impression 12.

If it is an impression 12*bis* produced on the bottom of the preform, the cutting device can be adjusted in order to cut the preform opposite the location where this impression 12*bis* has been produced.

Preferably, the production line for boards based on hydraulic binder is a production line for boards with feathered edges. Such a line will now be described in detail, as well as the manner in which the device is used in this line.

Figure 10:
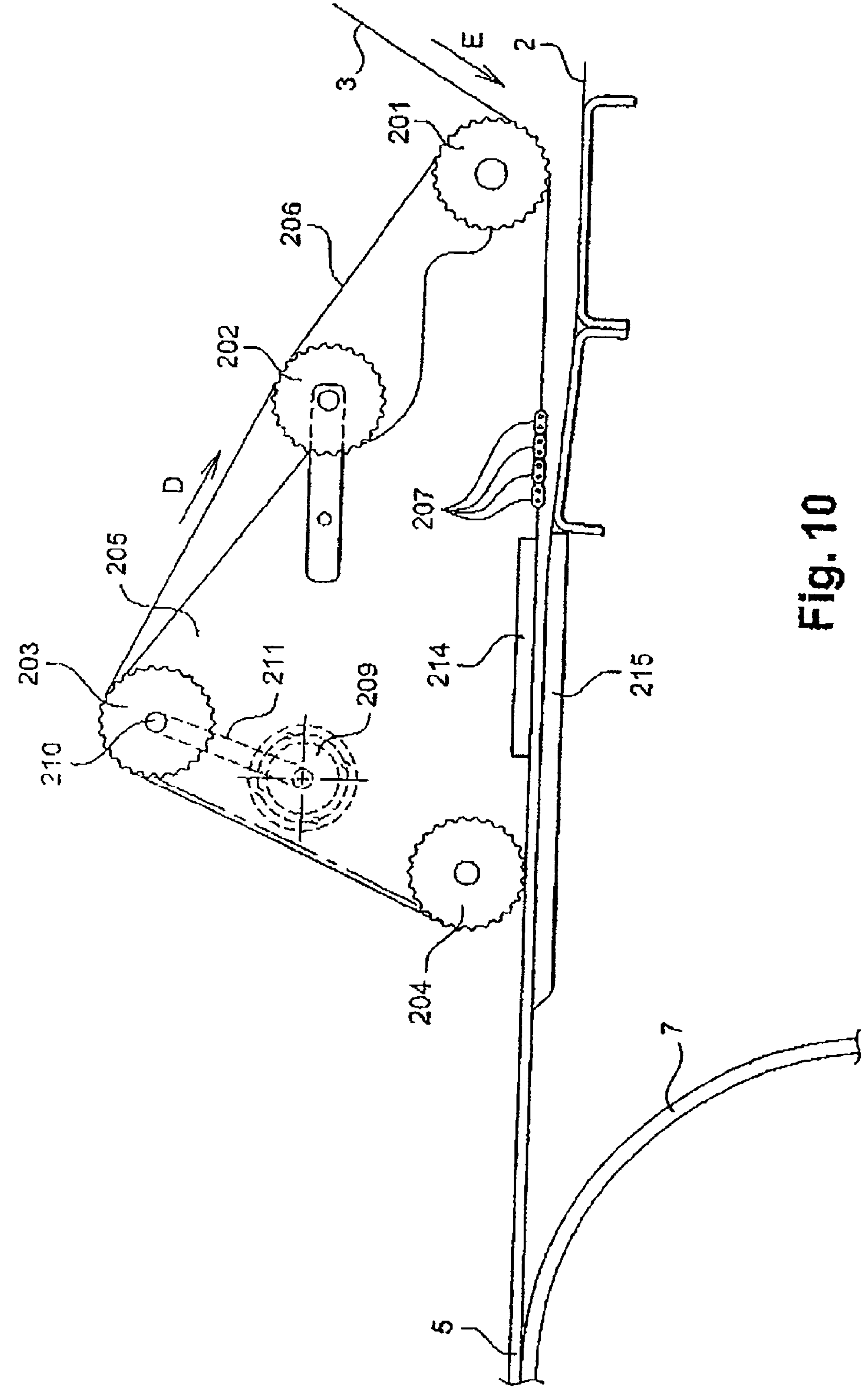
FIG. 10 diagrammatically represents a part of a production line for boards based on hydraulic binder according to an embodiment of the invention.

FIG. 10 represents a part of a production line produced according to a preferred embodiment of the invention.

This figure shows that the production line comprises a variant of the device.

This device, which is seen in profile in FIG. 10, comprises four first toothed wheels 201, 202, 203, 204 (or pulleys) supported by a frame 205 and surrounded by a chain 206 constituted by links, some of which links 207 can support wires corresponding to the ends of the bars of the laths.

This device is symmetrical relative to a vertical plane aligned with the direction of movement of the preform 5. Thus, the wires of the bars are held by the links 207 extending transversally relative to the preform 5 as far as a second chain, identical to the chain 206, and which surrounds second toothed wheels identical to the first toothed wheels 201, 202, 203, 204.

The device is provided with an electric motor 209 driving in rotation by means of a belt 211 the shaft 210 on which are mounted the wheel 203 and its symmetrical wheel. The rotation of these wheels drives that of the chain 206 in the direction indicated by the arrow D.

This preform 5 is obtained in a known manner by the introduction of the hydraulic binder paste in the direction indicated by the arrow E between the first facing material 2 and the second facing material 3 and the whole passes between the upper 214 and lower forming plates 215 of the device.

The distance between the toothed wheels 201, 202, 203, 204 and their symmetrical wheels is at least equal to that of the preform 5 so that these toothed wheels do not touch this preform 5.

The device is fixed at an appropriate height so that, during operation of the production line, the movement of the chain 206 driving that of the laths connected to the link 207, this lath passes into the forming area, i.e. between the upper 214 and lower plates 215 and projects downwards relative to the upper plate 214. The space occupied by this lath between the upper plate 214 and the second facing material 3 then results at this location in a feathering of the thickness of the preform 5.

Of course the operation of the motor is adjusted in such a way that the chain 206 moves at the same speed as the preform 5 when the lath passes between the plates 214 and 215. The lath 6 then accompanies the preform 5 over a few centimeters and, at the moment where it separates from the preform to rise by turning around the wheel 204, the lath leaves an impression in the upper part of the preform 5.

Given that it is simple to vary the speed of movement of the chain 206 by acting on the operation of the motor, it is easy to modify the spacing between two impressing and as a result the length of the boards.

The frame 205 of the device can, as can be seen from FIG. 10, be integral with the plates 214 and 215. It follows that the device can be used instead of a forming plate or a master roll which is used conventionally.

The impressions (12) left by the lath (6) will then produce feathered transverse edges which are on the side opposite the feathered longitudinal edges.

The process and the device are used for the production of plaster boards with four feathered edges. In particular, the disclosure allows the production of plaster boards described below.

The board can be a board made of hydraulic binder having a facing on each of its sides, comprising on one side two first feathered parallel edges (10) and on the other side two second other feathered parallel edges (25*bis*) perpendicular to the first ones. Said second feathered parallel edges (25*bis*) are advantageously transverse. See FIG. 11.

The board can also comprise two third feathered edges (25*ter*) parallel to the second feathered edges (25*bis*), on the other side of the board than the side comprising said second feathered edges (25*bis*). See FIG. 13.

In a variant, this board is such that the ratio of the depth of said second feathered edges (25*bis*) to the depth of said third feathered edges is comprised between 1 and 10, preferably between 2 and 5.

For example, said second other feathered parallel edges (25*bis*) have a width comprised between 100 and 200 mm, and/or comprised between 120 and 180 mm or between 150 and 200 mm or between 100 and 150 mm. Said first (10) and second feathered parallel edges (25*bis*) can have an approximately equal width.

According to a variant, said other feathered parallel edges (25*bis*) have a width such that the ratio of the width of said second feathered parallel edges (25*bis*) to the width of said first feathered parallel edges (10) is comprised between 1.5 and 5, preferably 2 and 4.

The disclosure also relates to boards which have four feathered edges, but this time which are not necessarily on the opposite side. Thus, the process also makes it possible to obtain a board made of hydraulic binder having a facing on each of its sides, comprising on one side two first feathered parallel edges (10) and either on the same side or on the other side two second feathered parallel edges (25*bis*) perpendicular to the first ones, said other feathered parallel edges (25*bis*) having a width comprised between 100 and 200 mm. In particular, in these boards, the width of said second feathered parallel edges (25*bis*) is comprised between 120 and 180 mm or between 150 and 200 mm or between 100 and 150 mm. For example, in these boards, said first (10) and second feathered parallel edges (25*bis*) have an approximately equal width, or also said other feathered parallel edges (25*bis*) have a width such that the ratio of the width of said second feathered parallel edges (25*bis*) to the width of said first feathered parallel edges (10) is comprised between 1.5 and 5, preferably 2 and 4.

The disclosure also relates to other boards which have four feathered edges, which are not necessarily on the opposite side. Thus, the process also makes it possible to obtain a board made of hydraulic binder having a facing on each of its sides, comprising on one side two first feathered parallel edges (10) and either on the same side or on the other face two second feathered parallel edges (25*bis*) perpendicular to the first ones, said second feathered parallel edges (25*bis*) having a width such that the ratio of the width of said second feathered parallel edges (25*bis*) to the width of said first feathered parallel edges (10) is comprised between 1.5 and 5.

According to a variant, the ratio is comprised between 2 and 4. For example, in these boards, the width of said second feathered parallel edges (25*bis*) is comprised between 100 and 200 mm, preferably between 120 and 180 mm or between 150 and 200 mm. Said second feathered parallel edges (25*bis*) are advantageously transverse.

The boards which can be produced by the process can also comprise moreover two third feathered edges (25*ter*) parallel to the second feathered edges (25*bis*), on the other side of the board than the side comprising said second feathered edges (25*bis*). According to a variant, the ratio of the depth of said second feathered edges (25*bis*) to the depth of said third feathered edges is comprised between 1 and 10, preferably between 2 and 5.

The disclosure therefore relates to these boards in which said second feathered parallel edges (25*bis*) are on the same side as said first feathered parallel edges (10), or in which said second feathered parallel edges (25*bis*) are on the other side than the side of said first feathered parallel edges (10).

The disclosure also relates to the production of boards comprising a marking on the side comprising the two first feathered parallel edges (10) and identifying the presence of the two other thinned parallel edges (25*bis*) perpendicular to the first ones, said board being intended to be used in cooperation with a second identical board, a feathered parallel edge (25*bis*) of a first board being but jointed to a feathered parallel edge (25*bis*) of a second board, these feathered edges (25*bis*) of said boards being identified by the marking present on the side comprising the two first feathered parallel edges (10) of said boards. This marking is in particular of the type described in the patent application WO-A-2005/028171, and in particular with reference to FIG. 20.

The hydraulic binder is preferably plaster.

Figure 11:
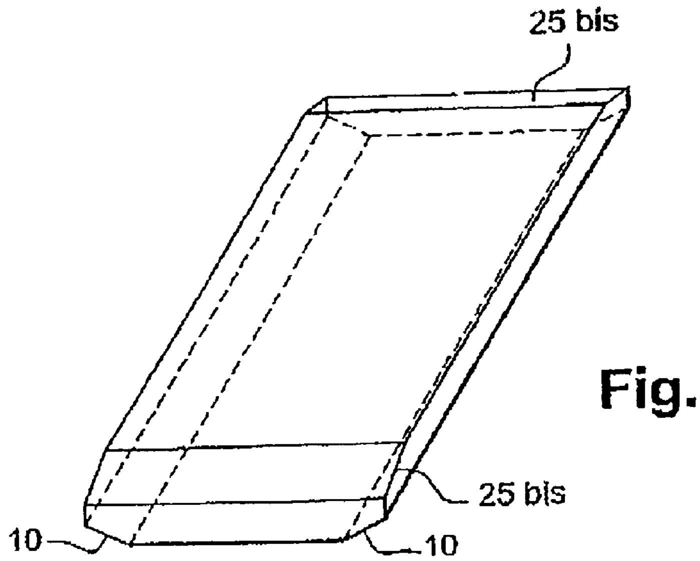
FIG. 11 diagrammatically represents a board made of hydraulic binder, which can be obtained according to an embodiment of the invention.

FIG. 11 describes a board with four feathered edges, two featherings of which are on one side while the others two are on the other side of the board. Such boards can be obtained with the process in which the impression is produced on the upper part of the preform. It is seen there that the feathered sections are arranged on each side of the board, in an opposite manner (the edge feathering are on the cream facing side (10) while the end featherings are on the other side, on the "grey" side (25*bis*)). The dimensions of the feathering 25*bis* are generally of the same order of magnitude as those of the featherings 25 (which generally corresponds to the dimensions of the lath). The feathering 25*bis* can therefore have a depth comprised between 0.5 and 4 mm, preferably between 1.5 and 4 mm. The width of the thinned edge can be comprised between 2 and 15 cm, preferably between 5 and 10 cm. The longitudinal featherings have the standard dimensions of the art, such as given by the "tapes" in a standard manner.

Figure 12:
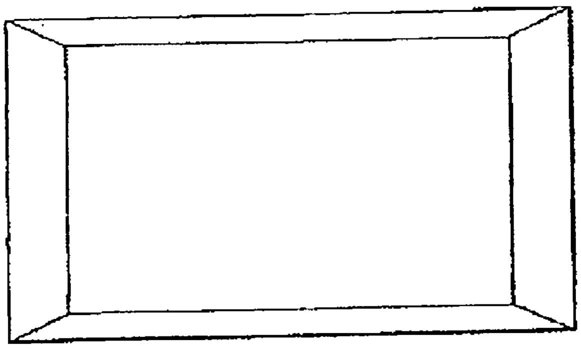
FIG. 12 diagrammatically represents a board made of hydraulic binder according to a second embodiment of the invention.

FIG. 12 represents a board according to a second embodiment, seen from the top. In this case, the board comprises the four feathered edges on the same side of the board. The dimensions indicated above apply here, in the same way as for FIG. 11.

Figure 13:
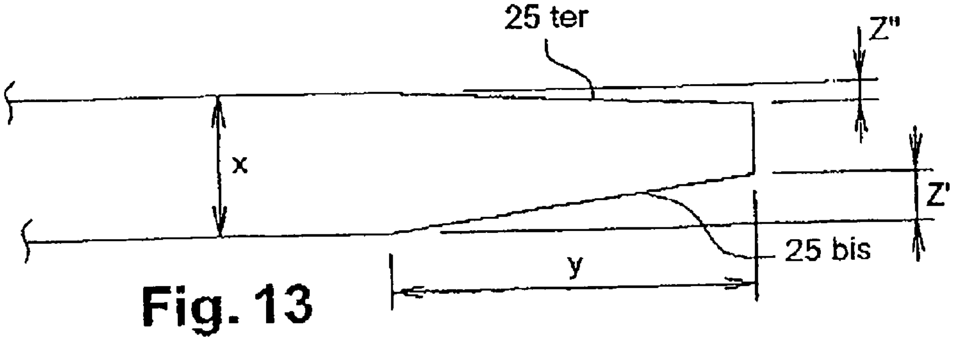
FIG. 13 diagrammatically represents in section a feathered edge of a board according to an embodiment of the invention.

FIG. 13 represents a section view of a specific feathered edge. In this embodiment, the feathered edge is simultaneously present on the two sides of the board. In this case, the board also comprises two third feathered edges (25*ter*) parallel to the second feathered edges (25*bis*), on the other side of the board. The dimensions are given again here, namely: X thickness of the board conventionally between 6 and 25 mm; Y width of the feathering comprised between 100 and 200 mm, preferably between 120 and 180 mm or between 150 and 200 mm as above; Z' (for example depth of the featherings 25*bis*) and Z" (for example depth of the third featherings 25*ter*) such that Z'+Z" is comprised between 0.5 and 4 mm, preferably between 0.5 and 3 mm, more preferably between 0.6 and 2.5 mm, or between 0.6 and 1.8 mm, advantageously between 0.8 and 1.8 mm or 0.5 and 1.5 mm. The ratio between the values Z' and Z" or Z':Z" is comprised for example between 1 and 10, preferably between 2 and 5.

Reference can also be made to the application WO-A-2005/028171 for more details on these embodiments, in particular with reference to FIGS. 19, 21 and 22.

The process for producing interior construction works using the boards produced by the process is of the type described and/or claimed in the patent application WO-A-2005/028171. Reference can be made in particular, in the case of the board described, in this FIG. 19, to FIGS. 23 A, 23B, 24A, B and C as well as 25A, B and C of this application WO-A-2005/028171.

The invention claimed is:

1. A production process for a board of hydraulic binder, the process comprising:

1) pouring a hydraulic binder slurry on a first facing material supported by a conveyor belt and at least two longitudinal forming strips, and covering the hydraulic binder slurry with a second facing material so as to obtain a preform;

2) producing an imprint in an upper part or a lower part of the preform using at least one lath having at least two distal parts and comprising a plurality of bars embedded in a polymer matrix at the level of the distal parts; the lath being withdrawn before hydraulic setting begins;

3) allowing for hydraulic setting of the hydraulic binder slurry to take place; and 4) cutting the preform at a level of a tapered section created by the imprint into the board of hydraulic binder with the facing materials on each of its sides, the board comprising on one side two first tapered parallel edges and on the one side or another side two second tapered parallel edges perpendicular to the first.

2. The production process according to claim 1, wherein the imprint is made by introducing the lath to the preform before a forming plate device.

3. The production process according to claim 1, wherein the imprint is made on the lower part of the preform.

4. The production process according to claim 1, wherein the imprint is made on the upper part of the preform.

5. The production process according to claim 1, wherein the bars are flat with a shape ratio comprised from 10:1 to 3:1.

6. The production process according to claim 1, wherein the two distal parts are separated by a central part, the central part representing 20 to 90% of a total width of the lath.

7. The production process according to claim 1, wherein the two distal parts are separated by a central part comprising a plurality of recesses.

8. The production process according to claim 7, wherein the recesses have a width comprised from 4 to 12 mm, a length comprised from 8 to 20 mm and a space between the recesses comprised from 15 to 30 mm.

9. The production process according to claim 1, wherein the hydraulic binder comprises gypsum.

10. The process according to claim 4, wherein in the board, the two second tapered parallel edges are transverse.

11. The process according to claim 1, wherein the board further comprises two third tapered edges parallel to the two second tapered edges, on a side of the board other than the side comprising the two second tapered edges.

12. The process according to claim 1, wherein in the board, the two second tapered parallel edges have a width comprised from 100 to 200 mm.

13. The process according to claim 1, wherein in the board, the depth ratio of the two second tapered edges to the depth of the two third tapered edges is comprised from 1 to 10.

14. The process according to claim 13, wherein in the board, the width of the two second tapered parallel edges is comprised from at least one of 120 to 180 mm, 150 to 200 mm, and 100 to 150 mm.

15. The process according to claim 1, wherein in the board, the two first and two second tapered parallel edges are approximately of equal width.

16. The process according to claim 1, wherein in the board, the two second tapered parallel edges have a width such that a width ratio of the two second tapered parallel edges to a width of the two first tapered parallel edges is comprised from 1.5 to 5.

17. A production line for hydraulic binder-based boards from a preform, the preform comprising a facing material covered with a hydraulic binder slurry and supported by a conveyor belt comprising a longitudinal forming strip, the preform further including a second facing material on an upper part thereof; the production line further comprising a device forming an imprint on the preform before the imprint encounters the forming strip, the imprint being made on the upper part of the preform, wherein the imprint-forming device comprises:

a frame;

two first pulleys supported at a first end of the frame and two second pulleys supported at a second end of the frame opposing the first end of the frame; the first pulleys and second pulleys being in parallel planes; the pulleys opposite one another being identical;

two drive belts encircling respectively the first pulleys and the second pulleys; and at least one lath attached in a removable manner to the belts and extended between the belts in such a way that a longitudinal axis of the at least one lath is parallel to a rotation axis of the pulleys, the lath having at least two distal parts; and a distance between the drive belts of the imprint-forming device being at least equal to a width of the preform, and the imprint-forming device being arranged in a manner so that when the drive belts turn, the lath creates an imprint in the preform.

18. The production line according to claim 17, further comprising upper and lower forming plates, between which the lath can pass.

19. The production line according to claim 17, wherein the hydraulic binder comprises gypsum.

20. The production line according to claim 17, wherein the lath comprises a plurality of bars embedded in a polymer matrix in the distal parts.

21. The production line according to claim 20, wherein the bars are flat with a shape ratio comprised from 10:1 to 3:1.

22. The production line according to claim 17, wherein the lath comprises two distal parts separated by a central part, the central part representing 20 to 90% of a total width of the lath.

23. The production line according to claim 17, wherein the two distal parts of the lath are separated by a central part comprising a plurality of recesses.

24. The production line according to claim 23, wherein the recesses have a width comprised from 4 to 12 mm, a length comprised from 8 to 20 mm and a space between the recesses comprised from 15 to 30 mm.

25. A production process for a board of hydraulic binder with a facing on each of its sides, the board comprising on one side two first tapered parallel edges and on another side two second tapered parallel edges perpendicular to the first, the process using a production line according to claim 17.

* * * * *